United States Patent
Kajino

(10) Patent No.: US 11,251,991 B2
(45) Date of Patent: Feb. 15, 2022

(54) COMMUNICATION SYSTEM, COMMUNICATION APPARATUS, COMMUNICATION METHOD, AND PROGRAM

(71) Applicant: Mitsubishi Electric Corporation, Tokyo (JP)

(72) Inventor: Atsushi Kajino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/278,336

(22) PCT Filed: Oct. 31, 2018

(86) PCT No.: PCT/JP2018/040508
§ 371 (c)(1),
(2) Date: Mar. 22, 2021

(87) PCT Pub. No.: WO2020/090032
PCT Pub. Date: May 7, 2020

(65) Prior Publication Data
US 2021/0314186 A1 Oct. 7, 2021

(51) Int. Cl.
*H04L 12/437* (2006.01)
*H04L 12/423* (2006.01)
*H04L 12/26* (2006.01)

(52) U.S. Cl.
CPC .......... *H04L 12/437* (2013.01); *H04L 12/423* (2013.01); *H04L 43/065* (2013.01); *H04L 43/0823* (2013.01); *H04L 43/10* (2013.01)

(58) Field of Classification Search
CPC combination set(s) only.
See application file for complete search history.

(56) References Cited

U.S. PATENT DOCUMENTS 5,361,260 A * 11/1994 Mito ...................... H04L 12/423
318/41
2003/0118042 A1 6/2003 Nishida et al.
(Continued)

FOREIGN PATENT DOCUMENTS

JP 9-98180 A 4/1997
JP 2000-224210 A 8/2000
(Continued)

OTHER PUBLICATIONS

International Search Report and Written Opinion dated Dec. 18, 2018, received for PCT Application PCT/JP2018/040508 Filed on Oct. 31, 2018, 7 pages including English Translation.
(Continued)

*Primary Examiner* — Xavier S Wong
(74) *Attorney, Agent, or Firm* — Xsensus LLP

(57) ABSTRACT

A communication system includes master and slave devices connectable to each other and forming a ring communication path. The master device outputs management data to manage communication along the ring communication path in a CW and CCW directions and receives the management data in the CW direction and in the CCW direction, and outputs, in the CW direction and in the CCW direction, control data to be used by the slave device to control equipment. The slave device acquires a history of transmission of the management data output from the master device and received by the slave device in the CW direction and in the CCW direction, and processes, based on the acquired history, one of the control data output from the master device in the CW direction and the control data output from the master device in the CCW direction to control the equipment.

7 Claims, 22 Drawing Sheets

(56) References Cited

U.S. PATENT DOCUMENTS

| | | | | |
|---|---|---|---|---|
| 2007/0147232 | A1* | 6/2007 | Takehara | G05B 9/02 |
| | | | | 370/217 |
| 2009/0290486 | A1 | 11/2009 | Wang | |
| 2009/0323521 | A1* | 12/2009 | Tochio | H04L 12/42 |
| | | | | 370/225 |
| 2011/0184533 | A1* | 7/2011 | Maruyama | H04L 12/40032 |
| | | | | 700/3 |

FOREIGN PATENT DOCUMENTS

| | | |
|---|---|---|
| JP | 2003-174479 A | 6/2003 |
| JP | 2003-348107 A | 12/2003 |
| JP | 2006-295667 A | 10/2006 |
| JP | 2009-284486 A | 12/2009 |
| JP | 2012-39456 A | 2/2012 |
| JP | 2016-5022 A | 1/2016 |

OTHER PUBLICATIONS

Decision to Grant dated Jun. 11, 2019, received for JP Application 2019-526017, 5 pages including English Translation.

* cited by examiner

MANAGEMENT DATA

CONTROL DATA

FIG.10

| | DETERMINATION INFORMATION | |
|---|---|---|
| PORT NUMBER | DIRECTION OF PATH | HISTORY INFORMATION INCLUDED IN RECEIVED MANAGEMENT DATA |
| 20a | 31 | COUNT OF RELAYS:X |
| 20b | 32 | COUNT OF RELAYS:Y |

| | 251 | |
|---|---|---|
| DETERMINATION INFORMATION ||| 
| PORT NUMBER | DIRECTION OF PATH | HISTORY INFORMATION INCLUDED IN RECEIVED MANAGEMENT DATA |
| 22a | 31 | COUNT OF RELAYS:1 |
| 22b | 32 | COUNT OF RELAYS:-1 |

FIG.12

| | 251 DETERMINATION INFORMATION | |
|---|---|---|
| PORT NUMBER | DIRECTION OF PATH | HISTORY INFORMATION INCLUDED IN RECEIVED MANAGEMENT DATA |
| 22a | 31 | COUNT OF RELAYS:1 |
| 22b | 32 | COUNT OF RELAYS:3 |

FIG.17

| | 251 |
|---|---|
| DETERMINATION INFORMATION | |

| PORT NUMBER | DIRECTION OF PATH | HISTORY INFORMATION INCLUDED IN RECEIVED MANAGEMENT DATA |
|---|---|---|
| 22a | 31 | COUNT OF RELAYS: -1 |
| 22b | 32 | COUNT OF RELAYS: 3 |

FIG.20

| DETERMINATION INFORMATION 251 | | |
|---|---|---|
| PORT NUMBER | DIRECTION OF PATH | TRAVELING PERIOD |
| 20a | 31 | T1 |
| 20b | 32 | T2 |

COMMUNICATION SYSTEM, COMMUNICATION APPARATUS, COMMUNICATION METHOD, AND PROGRAM

CROSS-REFERENCE TO RELATED APPLICATION

The present application is based on PCT filing PCT/JP2018/040508, filed Oct. 31, 2018, the entire contents of which are incorporated herein by reference.

TECHNICAL FIELD

The present disclosure relates to a communication system, a communication device, a communication method, and a program.

BACKGROUND ART

Factory automation (FA) systems using industrial networks are requested to operate with maintaining the FA systems against communication faults that are typically caused by cable breaks. This request may be satisfied by communication systems typically using ring networks to form ring communication paths with redundancy (see Patent Literature 1).

Patent Literature 1 describes a technique of routing on a ring network. The ring network includes two paths, a clockwise path and a counterclockwise path. With this technique, the nodes included in the ring network acquire information indicating the topology of the ring network, and select one of the two paths as a main path and the other as a backup path. The nodes output data onto the main path at normal times, and onto the backup path in response to detecting faults, thus maintaining communication against faults.

CITATION LIST

Patent Literature

Patent Literature 1: Unexamined Japanese Patent Application Publication No. 2009-284486

SUMMARY OF INVENTION

Technical Problem

With the technique described in Patent Literature 1, when a first node included in the ring network detects a malfunction in a link between the first node and a second node adjacent to the first node, the first node transmits a message through a link opposite to the second node to notify the malfunction to the other nodes. The other nodes receiving the massage to notify the malfunction then switch the communication direction from the main path to the backup path to maintain communication.

Transmitting the message causes a delay between the first node detecting the malfunction and the other nodes starting using the backup path for communication by switching the communication direction. Data transmitted through such a malfunctioning link may be lost before the communication path is switched. A communication fault in such a portion of the path may cause a fault in the entire communication system. Communication systems using ring communication paths are to have higher tolerance to such faults.

In response to the above issue, an objective of the present disclosure is to improve fault tolerance of a communication system using a ring communication path.

Solution to Problem

To achieve the above objective, a communication system according to an aspect of the present disclosure includes a master device and a slave device connectable to each other and forming a ring communication path. The master device outputs management data to manage communication along the ring communication path in a first direction and in a second direction opposite to the first direction and receives the management data in the first direction and in the second direction, and outputs, in the first direction and in the second direction, control data to be used by the slave device to control equipment. The slave device acquires a history of transmission of the management data output from the master device and received by the slave device in the first direction and in the second direction, and processes, based on the acquired history, one of the control data output from the master device in the first direction and the control data output from the master device in the second direction to control the equipment.

Advantageous Effects of Invention

The master device according to the above aspect of the present disclosure outputs control data in the first direction and in the second direction. The slave device according to the above aspect of the present disclosure processes one of the control data output from the master device in the first direction and the control data output from the master device in the second direction to control equipment. Thus, the master device transmits redundant control data in the first and second directions of the redundant communication path, and the slave device processes the control data transmitted in either the first or second direction. In response to any communication fault in one path, the slave device can receive control data without using the path with the fault. The communication system using the ring communication path thus has higher tolerance to faults.

BRIEF DESCRIPTION OF DRAWINGS

FIG. 10 is a diagram of determination information in Embodiment 1 showing the format;

FIG. 11 is a first diagram of example determination information in Embodiment 1;

FIG. 12 is a second diagram of example determination information in Embodiment 1;

FIG. 17 is a third diagram of example determination information in Embodiment 1;

FIG. 20 is a diagram of determination information in Embodiment 2 showing the format;

DESCRIPTION OF EMBODIMENTS

A communication system 100 according to one or more embodiments of the present disclosure will now be described in detail with reference to the drawings.

Embodiment 1

Figure 1:
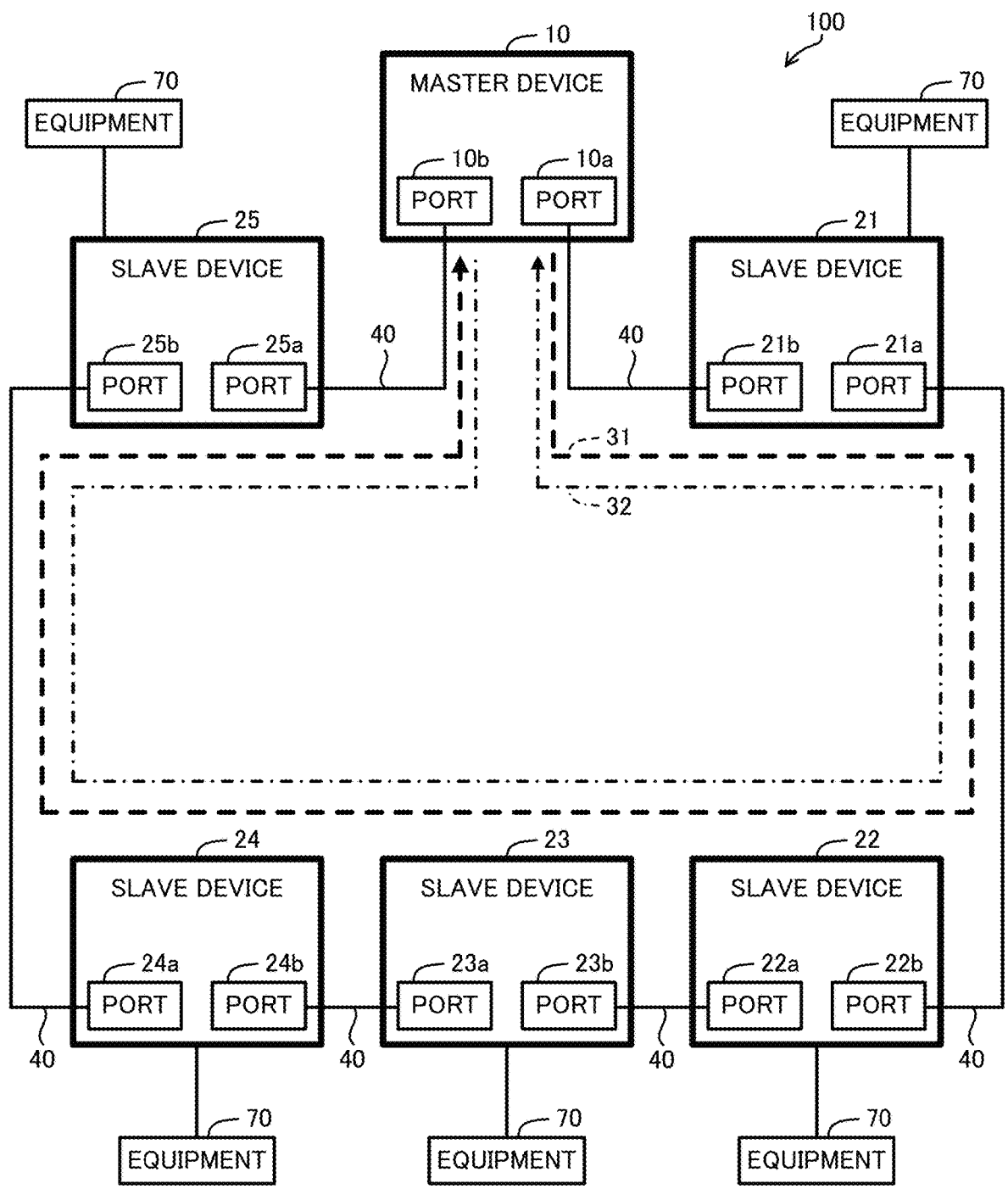
FIG. 1 is a block diagram of a communication system according to Embodiment 1 of the present disclosure.

The communication system 100 according to the present embodiment corresponds to a part of an FA system installed at a factory. The communication system 100 is a ring network formed by connecting pieces of equipment to one another with a communication channel. The pieces of equipment are components of the FA system for production, inspection, machining, or other purposes. As shown in FIG. 1, the communication system 100 includes a master device 10 and slave devices 21, 22, 23, 24, and 25 as communication devices.

The master device 10 and the slave devices 21 to 25 are, for example, programmable logic controllers (PLCs), devices to operate in cooperation with PLCs, or industrial personal computers (IPCs). The master device 10 and the slave devices 21 to 25 are connected to one another to form a ring communication path 40. More specifically, the master device 10 and the slave devices 21 to 25 each have two ports. The master device 10 and the slave devices 21 to 25 have the ports mutually connected with a communication line for communication. The communication line is a network cable.

More specifically, as shown in FIG. 1, the master device 10 has a port 10a for connecting to the slave device 21 with a communication line, and a port 10b for connecting to the slave device 25 with a communication line. The slave device 21 has a port 21a for connecting to the slave device 22 with a communication line, and a port 21b for connecting to the master device 10 with the communication line. The slave device 22 has a port 22a for connecting to the slave device 23 with a communication line, and a port 22b for connecting to the slave device 21 with the communication line. The slave device 23 has a port 23a for connecting to the slave device 24 with a communication line, and a port 23b for connecting to the slave device 22 with the communication line. The slave device 24 has a port 24a for connecting to the slave device 25 with a communication line, and a port 24b for connecting to the slave device 23 with the communication line. The slave device 25 has a port 25a for connecting to the master device 10 with the communication line, and a port 25b for connecting to the slave device 24 with the communication line. The master device 10 and the slave devices 21 to 25 are thus connected in a ring topology to form a ring network.

The communication system 100 as a ring network includes a redundant communication path 40 defining two paths. More specifically, the communication system 100 includes a path in a clockwise (CW) direction 31 from the master device 10 through the slave devices 21, 22, 23, 24, and 25 in this order and back to the master device 10, and a path in a counterclockwise (CCW) direction 32 from the master device 10 through the slave devices 25, 24, 23, 22, and 21 in this order and back to the master device 10. The CW direction 31 and the CCW direction 32 are the directions of the communication path 40 opposite to each other.

The master device 10 corresponds to a master node in the ring network, and the slave devices 21 to 25 all correspond to slave nodes in the ring network. The master device 10 provides a control instruction to each of the slave devices 21 to 25 through the redundant communication path in the CW direction 31 and the CCW direction 32. In response to the control instruction, the slave devices 21 to 25 each control equipment 70 connected to the corresponding one of the slave devices 21 to 25. Examples of the equipment 70 include sensor devices, actuators, and robots.

Figure 2:
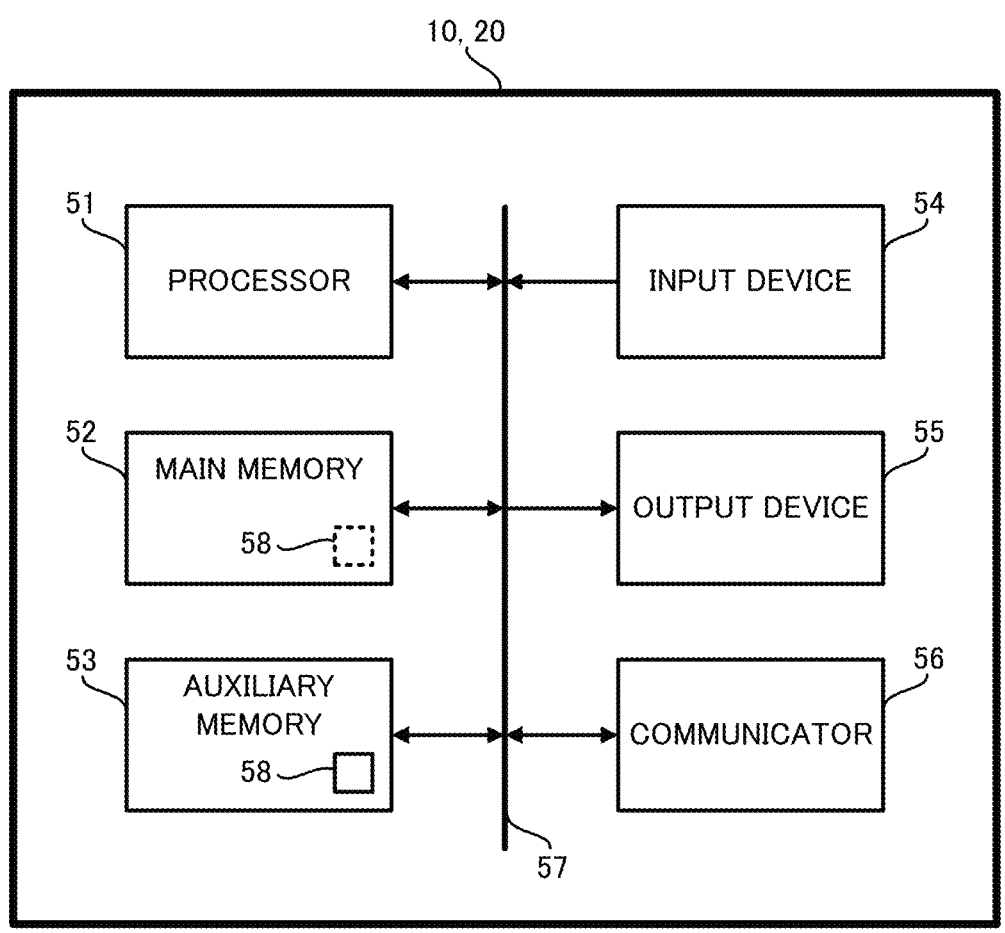
FIG. 2 is a block diagram of a master device and a slave device according to Embodiment 1 showing the hardware configuration.

The hardware configuration of the master device 10 and the slave devices 21 to 25 will now be described. The slave devices 21 to 25 are hereafter collectively referred to as a slave device 20 or slave devices 20 as appropriate. Each of the master device 10 and the slave device 20 is a computer including a processor 51, a main memory 52, an auxiliary memory 53, an input device 54, an output device 55, and a communicator 56 as shown in FIG. 2. The main memory 52, the auxiliary memory 53, the input device 54, the output device 55, and the communicator 56 are all connected to the processor 51 with an internal bus 57.

The processor 51 includes a central processing unit (CPU) or a micro processing unit (MPU). The processor 51 executes a program 58 stored in the auxiliary memory 53 to implement the various functions of the master device 10 and the slave device 20 and perform the processing described later.

The main memory 52 includes a random-access memory (RAM). The main memory 52 stores the program 58 loaded from the auxiliary memory 53. The main memory 52 is used as a work area by the processor 51.

The auxiliary memory 53 includes a nonvolatile memory, typically an electrically erasable programmable read-only memory (EEPROM). The auxiliary memory 53 stores, in addition to the program 58, various data items used in the processing performed by the processor 51. The auxiliary memory 53 provides data usable by the processor 51 to the processor 51, and stores data provided by the processor 51, as instructed by the processor 51.

The input device 54 includes input devices, typically a switch, input keys, a pointing device, and a camera. The input device 54 acquires information input by the user, and provides the acquired information to the processor 51.

The output device 55 includes output devices, typically a light-emitting diode (LED), a liquid crystal display (LCD), and a speaker. The output device 55 presents various pieces of information to the user as instructed by the processor 51.

The communicator 56 includes a communication interface circuit for communicating with external devices. The communicator 56 receives signals from external devices and outputs data represented by the signals to the processor 51. The communicator 56 also transmits signals representing data output from the processor 51 to external devices.

The functional components of the master device 10 and the slave device 20 will now be described. The master device 10 and the slave device 20 perform various functions with the above hardware components operating in cooperation.

The master device 10 as a master node outputs two types of data onto the redundant communication path 40. More specifically, the master device 10 outputs, as first data of the two types of data, management data to manage communication in the ring network. The master device 10 outputs the management data in each of the CW direction 31 and the CCW direction 32, and then receives the management data that has circulated through the ring network in each of the two directions. The master device 10 also outputs, as second data, control data to be used by the slave device 20 to control the equipment 70. The master device 10 outputs the control data in each of the CW direction 31 and the CCW direction 32. The control data is not limited to data representing the details of a control instruction provided from the master device 10, but may be data received by the master device 10. The control data received by the master device 10 corresponds to, for example, data provided from a slave node in response to a control instruction.

Figure 3:
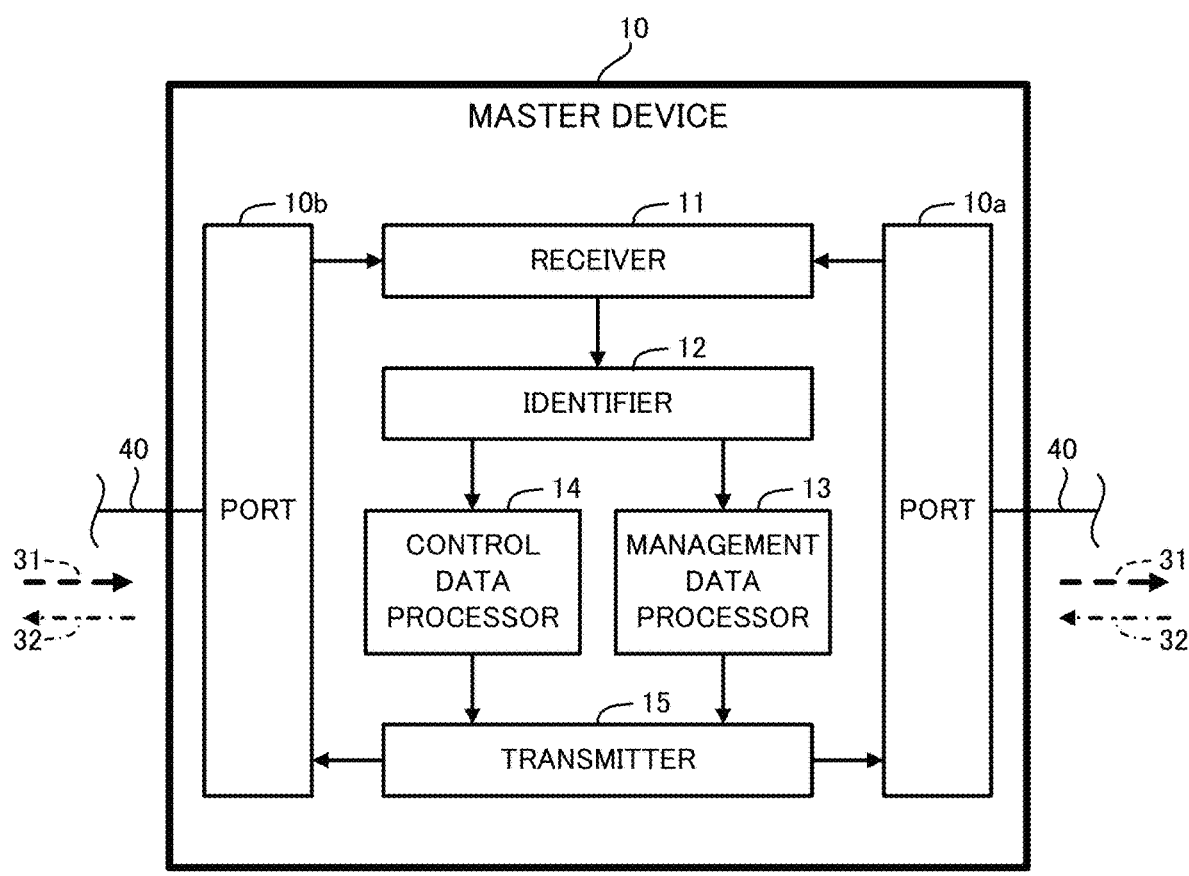
FIG. 3 is a functional block diagram of the master device according to Embodiment 1.

As shown in FIG. 3, the master device 10 includes, as the functional components, the ports 10a and 10b, a receiver 11 for receiving data, an identifier 12 for identifying control data and management data, a management data processor 13 for processing management data, a control data processor 14 for processing control data, and a transmitter 15 for transmitting data.

The ports 10a and 10b correspond to the communicator 56. The ports 10a and 10b each have a slot for receiving the communication line and a terminal. The ports 10a and 10b may be implemented as separate hardware components, or as a communication interface in a software component. The port 10a receives data input in the CCW direction 32, and outputs data in the CW direction 31. The port 10b receives data input in the CW direction 31, and outputs data in the CCW direction 32.

The receiver 11 is implemented by the processor 51 and the communicator 56 operating in cooperation. The receiver 11 receives data transmitted through the communication lines and through the ports 10a and 10b. The receiver 11 outputs received data to the identifier 12, together with the port number representing the port 10a or 10b that has received the data. The identifier 12 is implemented mainly by the processor 51. The identifier 12 identifies data output from the receiver 11 to be management data or control data. The identifier 12 then outputs the management data to the management data processor 13 or the control data to the control data processor 14, together with the port number of the port 10a or 10b that has received the data.

The management data processor 13 is implemented mainly by the processor 51. The management data processor 13 discards received management data. More specifically, the management data processor 13 discards received management data having a source being the address of the master device 10 to avoid the received management data continuing to circulate through the ring network. The management data processor 13 periodically generates new management data and outputs the new management data to the transmitter 15.

The control data processor 14 is implemented mainly by the processor 51. The control data processor 14 processes received control data. More specifically, the control data processor 14 discards received control data having a source being the address of the master device 10 to avoid the received control data continuing to circulate through the ring network. The control data processor 14 also processes control data output from the slave device 20 as appropriate. For example, the master device 10 that has instructed the slave device 20 to prepare for operation may receive control data representing completion of the preparation from the slave device 20. In this case, the control data processor 14 generates control data for instructing to start operation. In some embodiments, to provide a new control instruction to the slave device 20, the control data processor 14 generates control data representing the new control instruction to the slave device 20. The control data processor 14 then outputs the generated control data to the transmitter 15.

The transmitter 15 is implemented by the processor 51 and the communicator 56 operating in cooperation. The transmitter 15 duplicates management data output from the management data processor 13 and outputs the duplicated data in the CW direction 31 and the CCW direction 32. The management data output in the two directions circulates and is received by the receiver 11 in the ring network with no fault, but is not received by the receiver 11 in the ring network with any fault. The transmitter 15 also duplicates control data output from the control data processor 14 and outputs the duplicated data in the CW direction 31 and the CCW direction 32. The control data output in the two directions arrives at the destination slave device 20 through the two paths in the CW direction 31 and the CCW direction 32.

Figure 4:
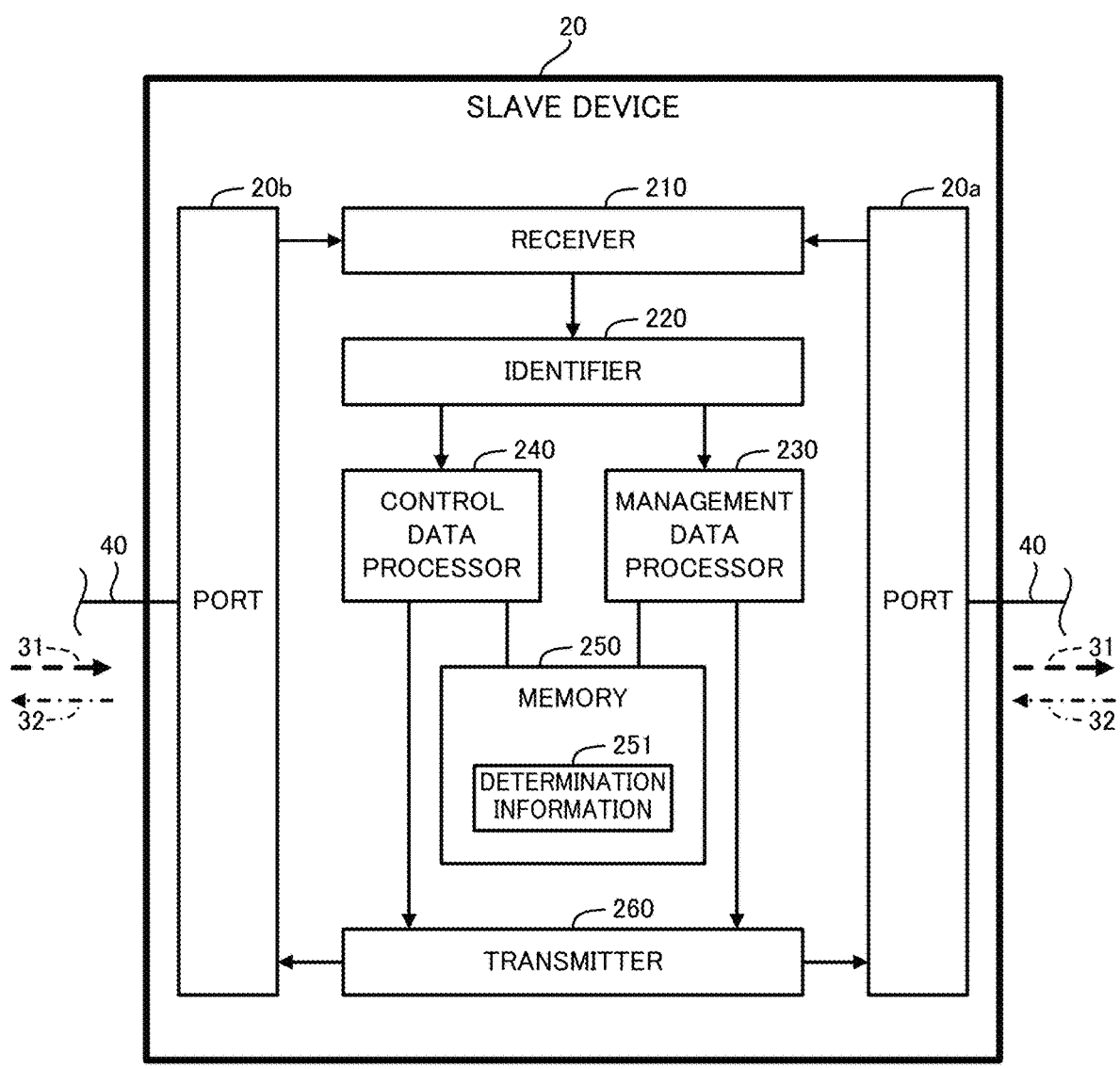
FIG. 4 is a functional block diagram of the slave device according to Embodiment 1.

As shown in FIG. 4, the slave device 20 includes, as the functional components, ports 20a and 20b, a receiver 210 for receiving data, an identifier 220 for identifying control data and management data, a management data processor 230 for processing management data, a control data processor 240 for processing control data, a memory 250 for storing determination information 251 for determining control data to be assigned a higher priority selectively from control data transmitted in the CW direction 31 and control data transmitted in the CCW direction 32, and a transmitter 260 for transmitting data.

The ports 20a and 20b correspond to the communicator 56. The port 20a is a collective term for the ports 21a, 22a, 23a, 24a, and 25a shown in FIG. 1, and the port 20b is a collective term for the ports 21b, 22b, 23b, 24b, and 25b. The ports 20a and 20b each have a slot for receiving the communication line and a terminal. The ports 20a and 20b may be implemented as separate hardware components, or as a communication interface in a software component. The port 20a receives data input in the CCW direction 32, and outputs data in the CW direction 31. The port 20b receives data input in the CW direction 31, and outputs data in the CCW direction 32.

The receiver 210 is implemented by the processor 51 and the communicator 56 operating in cooperation. The receiver 210 receives data transmitted through the communication lines and through the ports 20a and 20b. The receiver 210 outputs received data to the identifier 220, together with the port number representing the port 20a or 20b that has received the data. The identifier 220 is implemented mainly by the processor 51. The identifier 220 identifies data output from the receiver 210 to be management data or control data.

The identifier 220 then outputs the management data to the management data processor 230 or the control data to the control data processor 240, together with the port number of the port 20a or 20b that has received the data.

The management data processor 230 is implemented mainly by the processor 51. The management data processor 230 receives management data in the CW direction 31 and transfers the management data in the CW direction 31. The management data processor 230 also receives management data in the CCW direction 32 and transfers the management data in the CCW direction 32.

The management data processor 230 updates the determination information 251 in the memory 250 based on received management data. More specifically, the management data processor 230 writes information, as the determination information 251, onto the memory 250 based on the reception status of management data. The information is for determining which of control data received through the path in the CW direction 31 or control data received through the path in the CCW direction 32 is valid for reception. The management data processor 230 outputs the management data to the transmitter 260 and causes the transmitter 260 to transfer the management data.

The management data processor 230 also monitors the reception status of management data to be received periodically and detects a communication fault in the ring network. For example, in response to an interruption of management data to be received in the CW direction 31, the management data processor 230 detects a fault in the communication channel extending from the master device 10 in the CW direction 31. Upon detecting the interruption, the management data processor 230 writes the determination information 251 onto the memory 250 for indicating that control data received in the CCW direction 32 is to be assigned priority. In response to an interruption of management data to be received in the CCW direction 32, the management data processor 230 detects a fault in the communication channel extending from the master device 10 in the CCW direction 32. Upon detecting the interruption, the management data processor 230 writes the determination information 251 onto the memory 250 for indicating that control data received in the CW direction 31 is to be assigned priority.

The control data processor 240 is implemented mainly by the processor 51. Upon receiving control data having the destination to be the slave device 20 including the control data processor 240, the control data processor 240 determines, based on the determination information 251, control data received in one of the CW direction 31 and the CCW direction 32 to be valid, and determines control data received in the other direction to be invalid. The control data processor 240 processes the control data determined to be valid and starts controlling the equipment 70 in accordance with the control instruction. The control data processor 240 also discards the control data determined to be invalid.

Upon receiving control data having the destination to be a slave device 20 different from the slave device 20 including the control data processor 240, the control data processor 240 outputs, to the transmitter 260, the control data with no change, and causes the transmitter 260 to transfer the control data. For example, the control data processor 240 in the slave device 22 receives control data having the destination to be the slave device 23 in the CW direction 31, and causes this control data to be transferred in the CW direction 31. In another example, the control data processor 240 in the slave device 22 receives control data having the destination to be the slave device 21 in the CCW direction 32, and causes this control data to be transferred in the CCW direction 32.

The memory 250 is implemented mainly by the auxiliary memory 53. The determination information 251 stored in the memory 250 will be described in detail later.

The transmitter 260 is implemented by the processor 51 and the communicator 56 operating in cooperation. The transmitter 260 transfers management data output from the management data processor 230, and transfers control data output from the control data processor 240.

Figure 5:
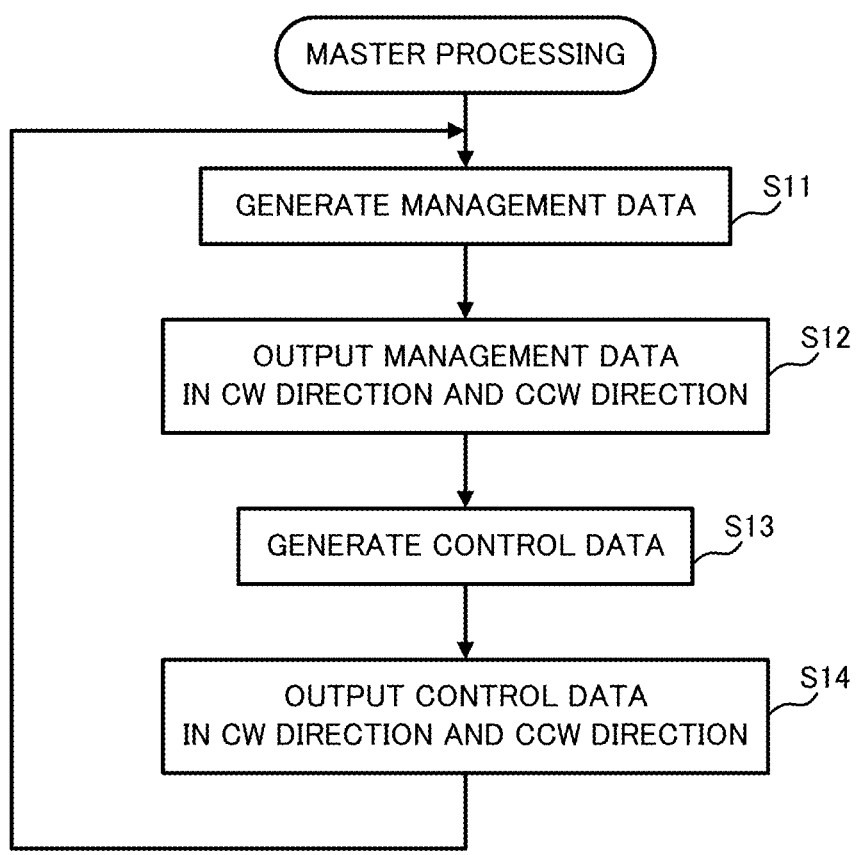
FIG. 5 is a flowchart showing master processing in Embodiment 1.
Figure 6:
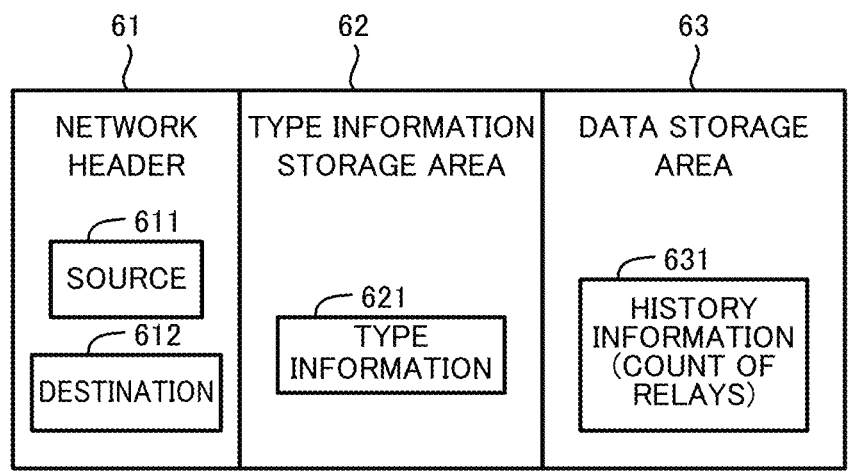
FIG. 6 is a diagram of management data in Embodiment 1 showing the data structure.
Figure 7:
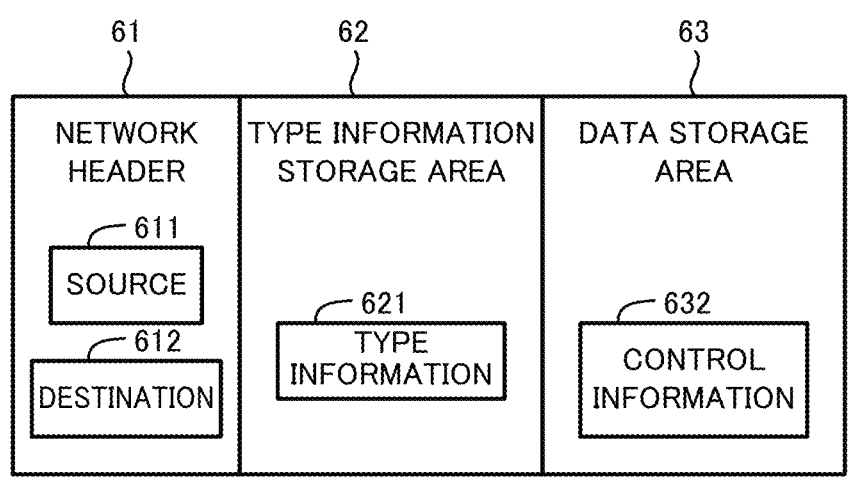
FIG. 7 is a diagram of control data in Embodiment 1 showing the data structure.

The master processing performed by the master device 10 will now be described with reference to FIGS. 5 to 7. The master processing shown in FIG. 5 starts when the master device 10 is powered on.

In the master processing, the management data processor 13 generates management data (step S11). As shown in FIG. 6, management data includes a network header 61 defining a source 611 and a destination 612 of the management data, a type information storage area 62 storing type information 621 indicating that the data is management data, and a data storage area 63 corresponding to a payload and storing history information 631. Management data includes the source 611 and the destination 612 both indicating the address of the master device 10. Management data includes the destination 612 indicating the address that can be received by all the slave devices 20, and the management data is broadcasted. Management data may include the destination 612 indicating an address that can be received by the master device 10, or indicating the address of the master device 10, in addition to the destination 612 indicating the address that can be received by all the slave devices 20. Management data may include the source 611 and the destination 612 of any address that allows management data to circulate through the communication path 40 and then to be discarded.

The type information 621 in the management data is, for example, M-1234, with M indicating that the data is management data and the identifier 1234 identifying the management data. The history information 631 indicates the history of transmission of management data on the ring network. In other words, the history information 631 indicates the history of transmission of management data output from the master device 10 and received by the slave device 20 in each of the CW direction 31 and the CCW direction 32. More specifically, the history information 631 indicates the count of relays, or more specifically, the count of slave devices 20 that have relayed the management data output from the master device 10. The management data processor 13 generates management data with the count of relays being zero.

Referring back to FIG. 5, the transmitter 15 outputs the management data generated in step S11 in each of the CW direction 31 and the CCW direction 32 (step S12). More specifically, the transmitter 15 outputs the management data through the port 10a to the slave device 21, and also outputs management data identical to this management data through the port 10b to the slave device 25. The transmitter 15 may output management data in the two directions at the same time, but may also be at different times. With no fault in the communication path 40, the management data output in this manner circulates and is received by the receiver 11.

The control data processor 14 then generates control data (step S13). As shown in FIG. 7, control data includes the network header 61, the type information storage area 62, and the data storage area 63. Control data includes the source 611 and the destination 612 different from each other. For example, control data representing a control command from the master device 10 has the destination 612 indicating the address of a slave device 20 and the source 611 indicating the address of the master device 10. The type information 621 in the control data is, for example, C-5678, with C indicating that the data is control data and the identifier 5678 identifying the control data. The data storage area 63 in control data stores control information 632 indicating the details of the control.

Referring back to FIG. 5, the transmitter 15 outputs the control data generated in step S13 in each of the CW direction 31 and the CCW direction 32 (step S14). More specifically, the transmitter 15 outputs the control data through the port 10a to the slave device 21, and also outputs control data identical to this control data through the port 10b to the slave device 25. The transmitter 15 may output control data in the two directions at the same time or at different times.

The master device 10 then repeats the processing in step S11 and subsequent steps, thus outputting management data and control data periodically. The master device 10 outputs these data items in predetermined cycles of, for example, 10 microseconds, 100 microseconds, 1 millisecond, or 10 milliseconds.

The slave processing performed by a slave device 20 will now be described with reference to FIGS. 8 to 17. The slave processing shown in FIG. 8 starts when the slave device 20 is powered on.

In the slave processing, the determination is performed as to whether the receiver 210 has received data (step S21). More specifically, the determination is performed as to whether the receiver 210 has received data through either the port 20a or 20b.

When the data has not been received (No in step S21), the slave device 20 advances the processing to step S27. When the data has been received (Yes in step S21), the slave device 20 determines whether the received data in step S21 is management data (step S22). More specifically, with the identifier 220 reading the type information 621 in the data, the slave device 20 determines whether the data is management data or control data.

Figure 9:
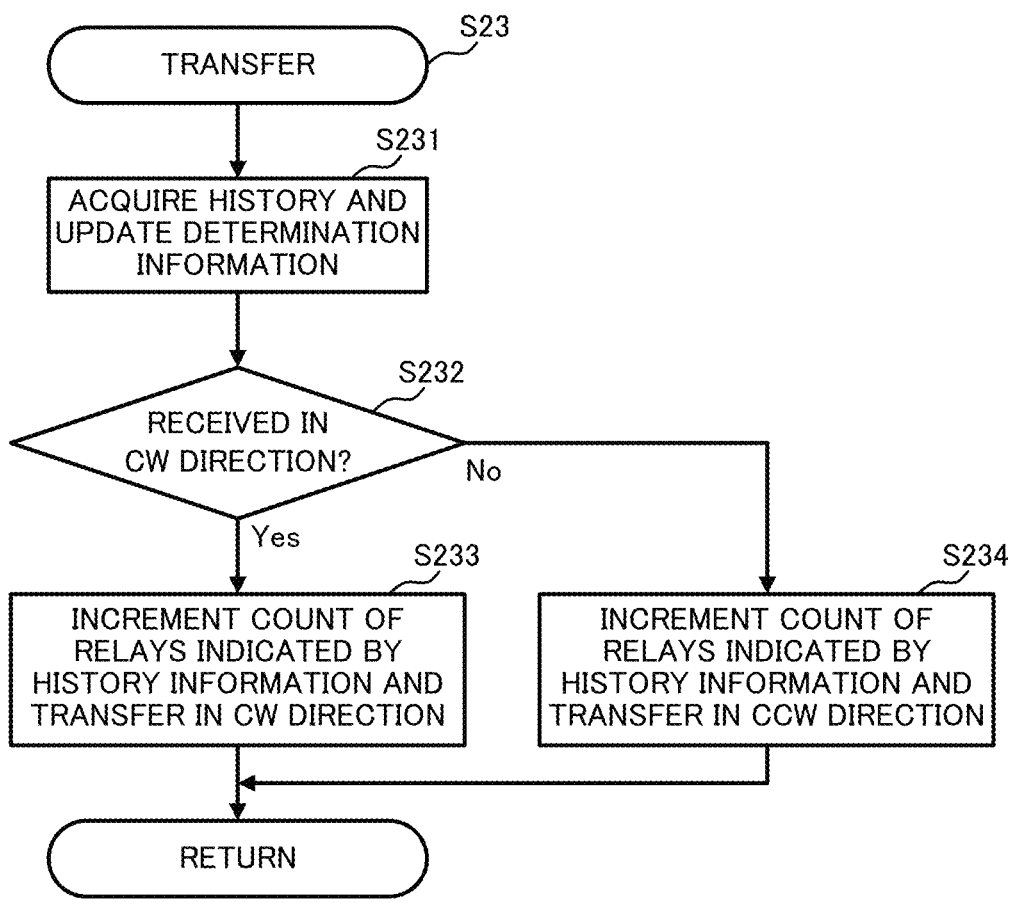
FIG. 9 is a flowchart showing a data transfer in Embodiment 1.

When the data is determined to be management data (Yes in step S22), the management data processor 230 performs a data transfer (step S23). FIG. 9 shows the details of the data transfer. In the data transfer, as shown in FIG. 9, the management data processor 230 acquires the history of transmission of management data to be transferred, and updates the determination information 251 stored in the memory 250 (step S231). More specifically, the management data processor 230 reads the history information 631 included in the management data, and updates the determination information 251 based on the read history information 631.

As shown in FIG. 10, the determination information 251 is in a table that mutually associates the port number of the port that has received the management data, the direction of the communication path on which the management data has been received, and the history information 631 included in the management data. In FIG. 10, the port numbers are identical to the reference signs of the ports 20a and 20b, the communication paths are identical to the reference signs of the CW direction 31 and the CCW direction 32, and the history information 631 indicates the count of relays. The determination information 251 includes the count of relays with an initial value of −1.

The management data processor 230 retrieves the history information 631 from the data storage area 63 in the received management frame, acquires the count of relays indicated by the history information 631, and updates the determination information 251 by associating the port number of the port that has received the management data with the acquired count of relays.

For example, the slave device 22 receives management data in the CW direction 31 through the port 22a. In this case, the management data has been relayed once by the slave device 21 and thus has the count of relays being 1. As shown in FIG. 11, the management data processor 230 updates the count of relays associated with the port number 22a and the communication path 31 to 1. The port number 22b in FIG. 11 is associated with the count of relays being the initial value of −1.

The slave device 22 may further receive management data in the CCW direction 32 through the port 22b. In this case, the management data has been relayed three times by the slave devices 25, 24, and 23 in this order and thus has the count of relays being 3. As shown in FIG. 12, the management data processor 230 updates the count of relays associated with the port number 22b and the communication path 32 to 3.

Referring back to FIG. 9, after step S231, the management data processor 230 determines whether the management data has been received in the CW direction 31 based on the port number of the port that has received the management data (step S232). When determining that the management data has been received in the CW direction 31 (Yes in step S232), the management data processor 230 increments, by 1, the count of relays indicated by the history information 631, and transfers the management data in the CW direction 31 (step S233). For example, the slave device 22 receives management data with the count of relays being 1 from the slave device 21, increments the count of relays to 2, and transfers this management data to the slave device 23. The slave device 22 thus transmits the management data with the count of relays being 2 to the slave device 23. The processing performed by the slave devices 20 then returns from the data transfer to the slave processing shown in FIG. 8.

When determining that the management data has not been received in the CW direction 31 (No in step S232), the management data processor 230 determines that the management data has been received in the CCW direction 32. The management data processor 230 then increments, by 1, the count of relays indicated by the history information 631, and transfers the management data in the CCW direction 32 (step S234). For example, the slave device 22 receives management data with the count of relays being 3 from the slave device 23, increments the count of relays to 4, and transfers this management data to the slave device 21. The slave device 22 thus transmits the management data with the count of relays being 4 to the slave device 21. The processing performed by the slave devices 20 then returns from the data transfer to the slave processing shown in FIG. 8.

Figure 8:
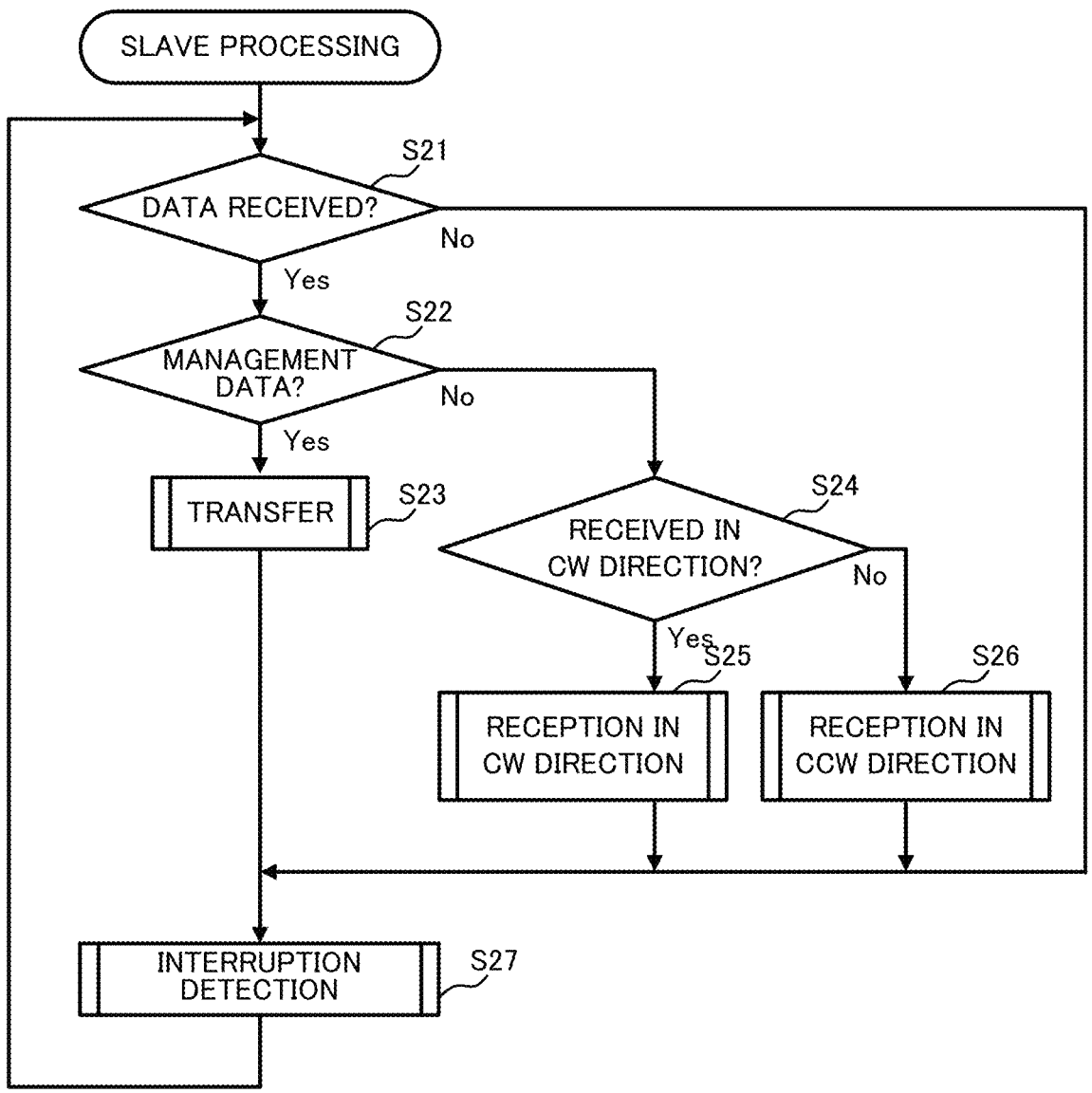
FIG. 8 is a flowchart showing slave processing in Embodiment 1.

When determining, in step S22 in FIG. 8, that the received data is not management data (No in step S22), the control data processor 240 determines that the data is control data. The control data processor 240 then determines whether the control data has been received in the CW direction 31 based on the port number of the port that has received the control data (step S24).

Figure 13:
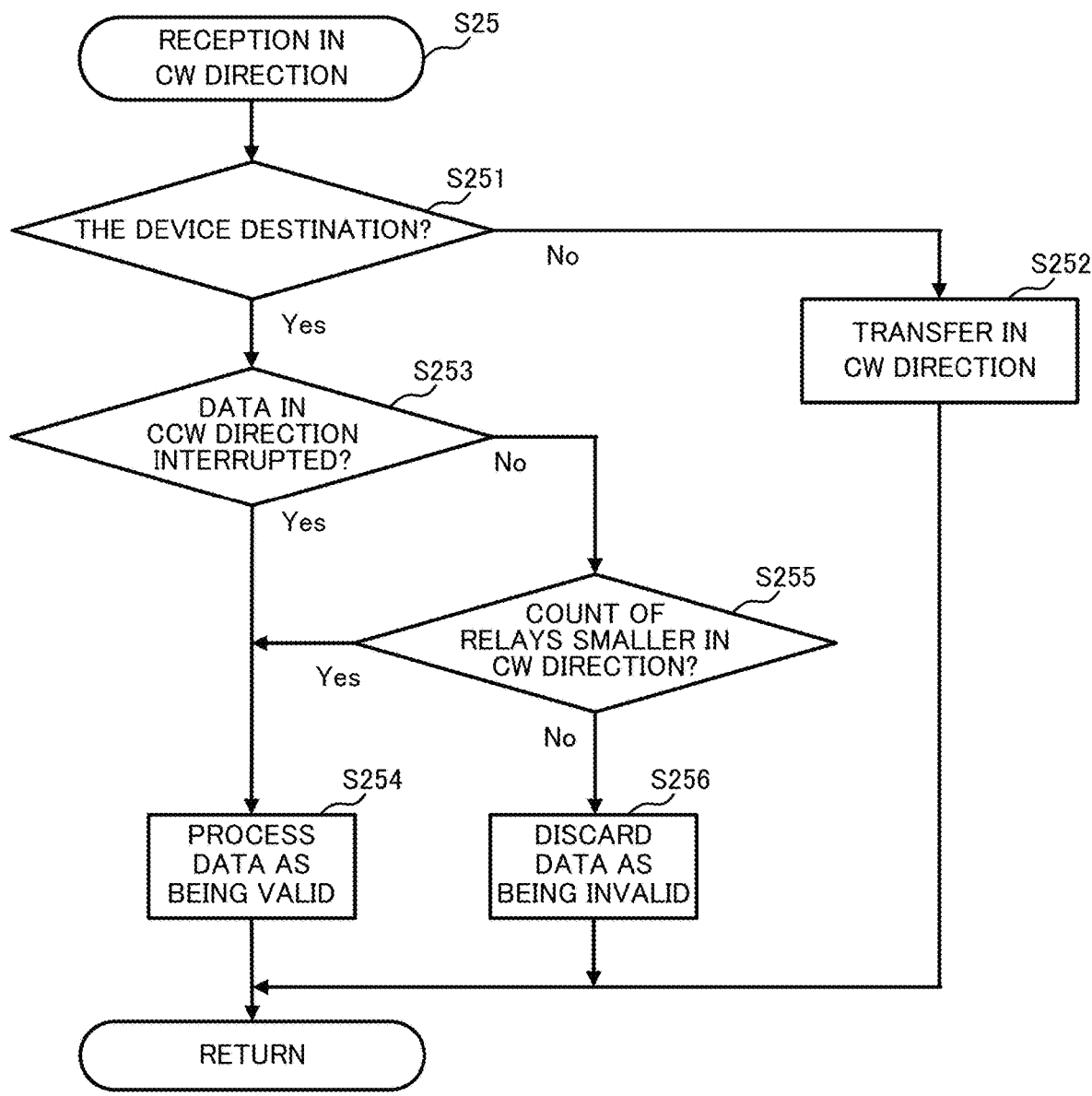
FIG. 13 is a flowchart showing a reception in a CW direction in Embodiment 1.

When determining that the control data has been received in the CW direction 31 (Yes in step S24), the control data processor 240 performs a reception in the CW direction 31 (step S25). FIG. 13 shows the details of the reception in the CW direction 31.

As shown in FIG. 13, in the reception in the CW direction 31, the control data processor 240 determines whether the received control data has the destination to be the slave device 20 including the control data processor 240 (step S251). More specifically, the control data processor 240 reads the destination 612 of the control data and determines whether the destination 612 is identical to the address of the slave device 20 including the control data processor 240.

When determining that the control data does not have the destination to be the slave device 20 including the control data processor 240 (No in step S251), the control data processor 240 transfers, in the CW direction 31, the received control data with no change (step S252). The processing performed by the slave device 20 then returns from the reception in the CW direction 31 to the slave processing shown in FIG. 8.

When determining that the control data has the destination to be the slave device 20 including the control data processor 240 (Yes in step S251), the control data processor 240 determines whether data in the CCW direction 32 is interrupted (step S253). More specifically, the control data processor 240 reads the determination information 251 and determines whether the count of relays associated with the path in the CCW direction 32 is −1. The count of relays is set to −1 in response to an interruption of management data to be received in the CCW direction 32, as described later. Thus, the control data processor 240 referring to the determination information 251 can determine whether a communication fault has occurred.

When determining that data in the CCW direction 32 is interrupted (Yes in step S253), the control data processor 240 determines that the received control data is valid and processes this control data (step S254). More specifically, the control data processor 240 starts control using the control information 632 included in the control data to control the equipment 70. Thus, in response to an interruption of data in the CCW direction 32, the control data processor 240 processes control data in the CW direction 31.

When determining that data in the CCW direction 32 is not interrupted (No in step S253), the control data processor 240 determines whether the count of relays is smaller in the CW direction 31 (step S255). More specifically, the control data processor 240 reads the determination information 251 and determines whether the count of relays associated with the CW direction 31 is smaller than the count of relays associated with the CCW direction 32. Thus, the control data processor 240 determines whether the hop count from the master device 10 or the master node is lower in the CW direction 31 than in the CCW direction 32. For example, in the example shown in FIG. 12, the control data processor 240 determines that the count of relays is smaller in the CW direction 31. When the CW direction 31 and the CCW direction 32 have the same count of relays, the control data processor 240 may assign priority to a predetermined one of the CW direction 31 and the CCW direction 32.

When determining that the count of relays is smaller in the CW direction 31 (Yes in step S255), the control data processor 240 advances the processing to step S254. Thus, the control data processor 240 assigns priority to the path with the lower hop count to process the control data.

When determining that the count of relays is not smaller in the CW direction 31 (No in step S255), the control data processor 240 determines that the control data is invalid and discards this control data (step S256). Thus, with no interruption of data in the CCW direction 32, the control data processor 240 discards, without processing, data in the CW direction 31 that has the higher hop count. The processing performed by the slave device 20 then returns from the reception in the CW direction 31 to the slave processing shown in FIG. 8.

Figure 14:
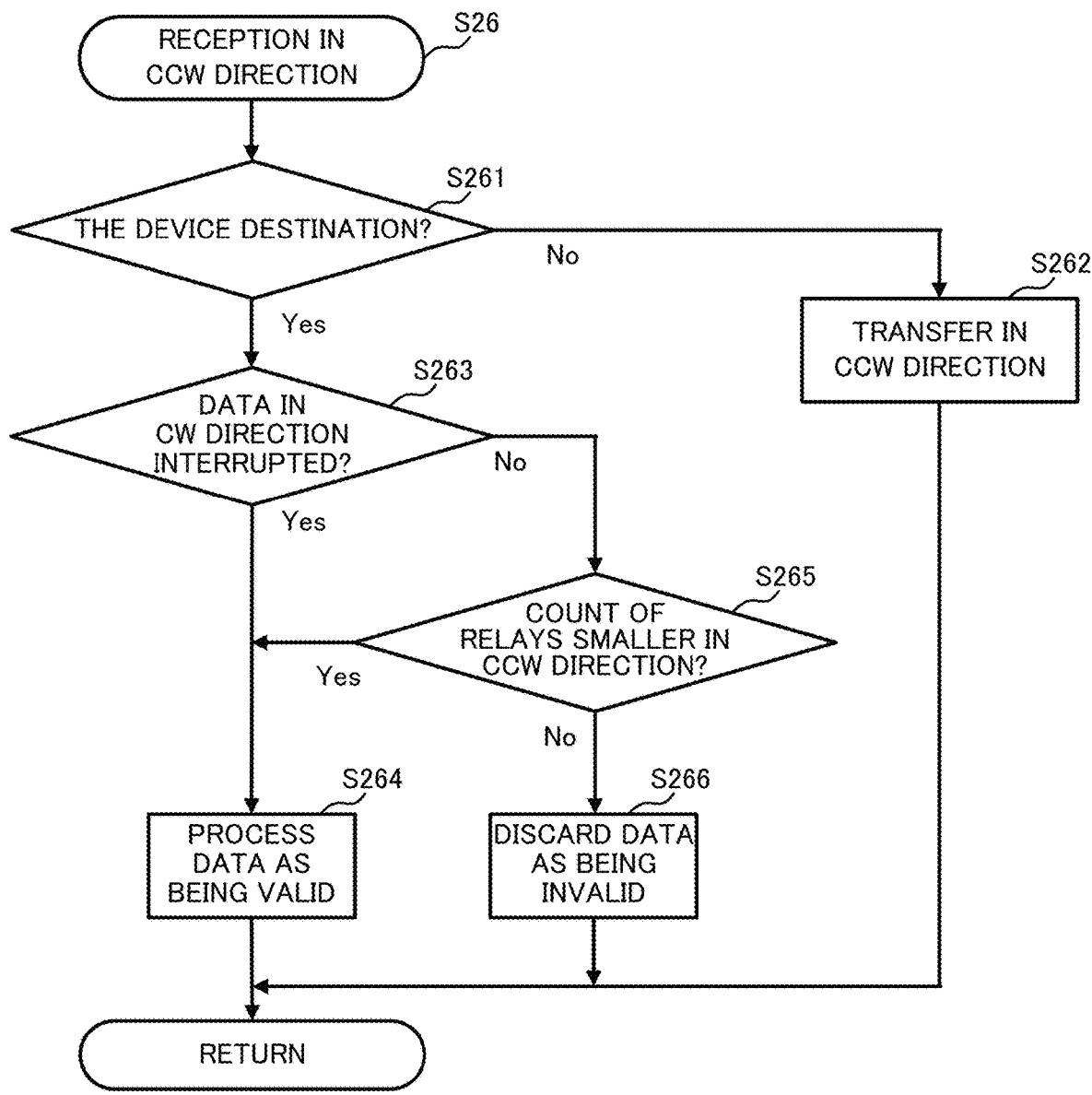
FIG. 14 is a flowchart showing a reception in a CCW direction in Embodiment 1.

When determining that the control data has not been received in the CW direction 31 in step S24 in FIG. 8 (No in step S24), the control data processor 240 performs a reception in the CCW direction 32 (step S26). The reception in the CCW direction 32 corresponds to the above reception in the CW direction 31 but with the CW direction 31 replaced with the CCW direction 32. FIG. 14 shows the details of the reception in the CCW direction 32.

As shown in FIG. 14, in the reception in the CCW direction 32, the control data processor 240 determines whether the control data has the destination to be the slave device 20 including the control data processor 240 (step S261). When determining that the control data does not have the destination to be the slave device 20 including the control data processor 240 (No in step S261), the control data processor 240 transfers, in the CCW direction 32, the control data with no change (step S262). The processing performed by the slave device 20 then returns from the reception in the CCW direction 32 to the slave processing shown in FIG. 8.

When determining that the control data has the destination to be the slave device 20 including the control data processor 240 (Yes in step S261), the control data processor 240 determines whether data in the CW direction 31 is interrupted (step S263). When determining that data in the CW direction 31 is interrupted (Yes in step S263), the control data processor 240 determines that the control data is valid and processes this control data (step S264). The processing performed by the slave device 20 then returns from the reception in the CCW direction 32 to the slave processing shown in FIG. 8.

When determining that data in the CW direction 31 is not interrupted (No in step S263), the control data processor 240 determines whether the count of relays is smaller in the CCW direction 32 (step S265). When determining that the count of relays is smaller in the CCW direction 32 (Yes in step S265), the control data processor 240 advances the processing to step S264.

When determining that the count of relays is not smaller in the CCW direction 32 (No in step S265), the control data processor 240 determines that the control data is invalid and discards this control data (step S266). The processing performed by the slave device 20 then returns from the reception in the CCW direction 32 to the slave processing shown in FIG. 8.

Figure 15:
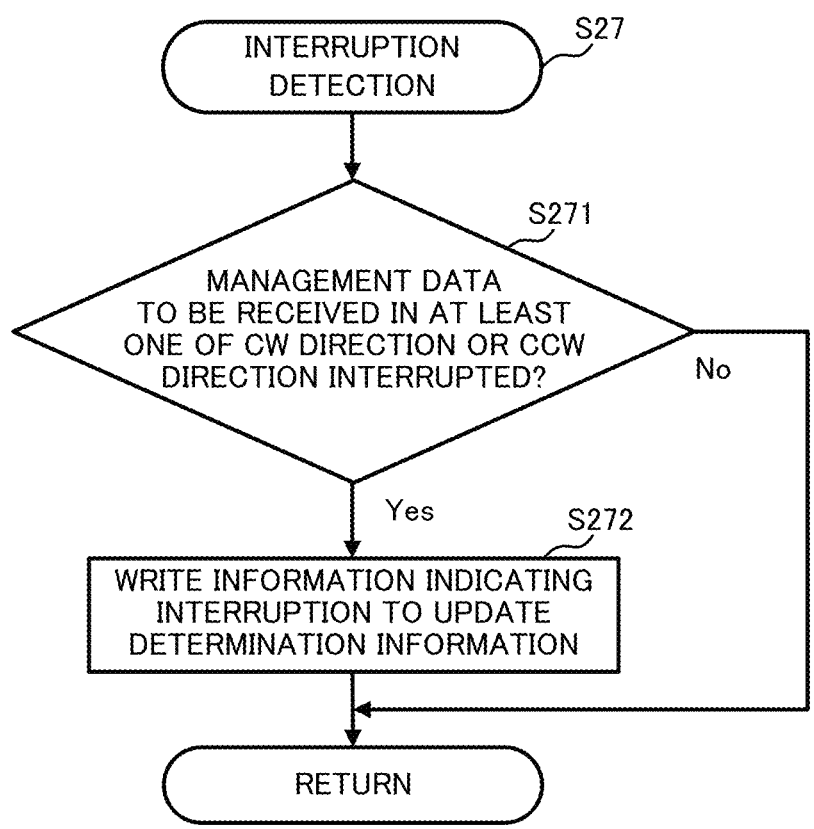
FIG. 15 is a flowchart showing an interruption detection in Embodiment 1.

Referring back to FIG. 8, after steps S23, S25, and S26, the management data processor 230 performs an interruption detection (step S27). In the interruption detection, the slave device 20 determines the communication status of each of the two directions based on whether management data has been received, and detects a communication fault in the ring network. FIG. 15 shows the details of the interruption detection.

As shown in FIG. 15, in the interruption detection, the management data processor 230 determines whether management data to be received periodically in at least one of the CW direction 31 and the CCW direction 32 is interrupted for a predetermined period of time (step S271). More specifically, the management data processor 230 determines whether a predetermined period of time has elapsed with no reception of new management data after the last reception of management data in the CW direction 31, and determines whether a predetermined period of time has elapsed with no reception of new management data after the last reception of management data in the CCW direction 32. The predetermined period of time corresponds to, for example, 1.5, 2, or 5 times the transmission cycle of management data. The predetermined period of time is a time length in detecting the fault after a communication fault and thus may be minimized.

Figure 16:
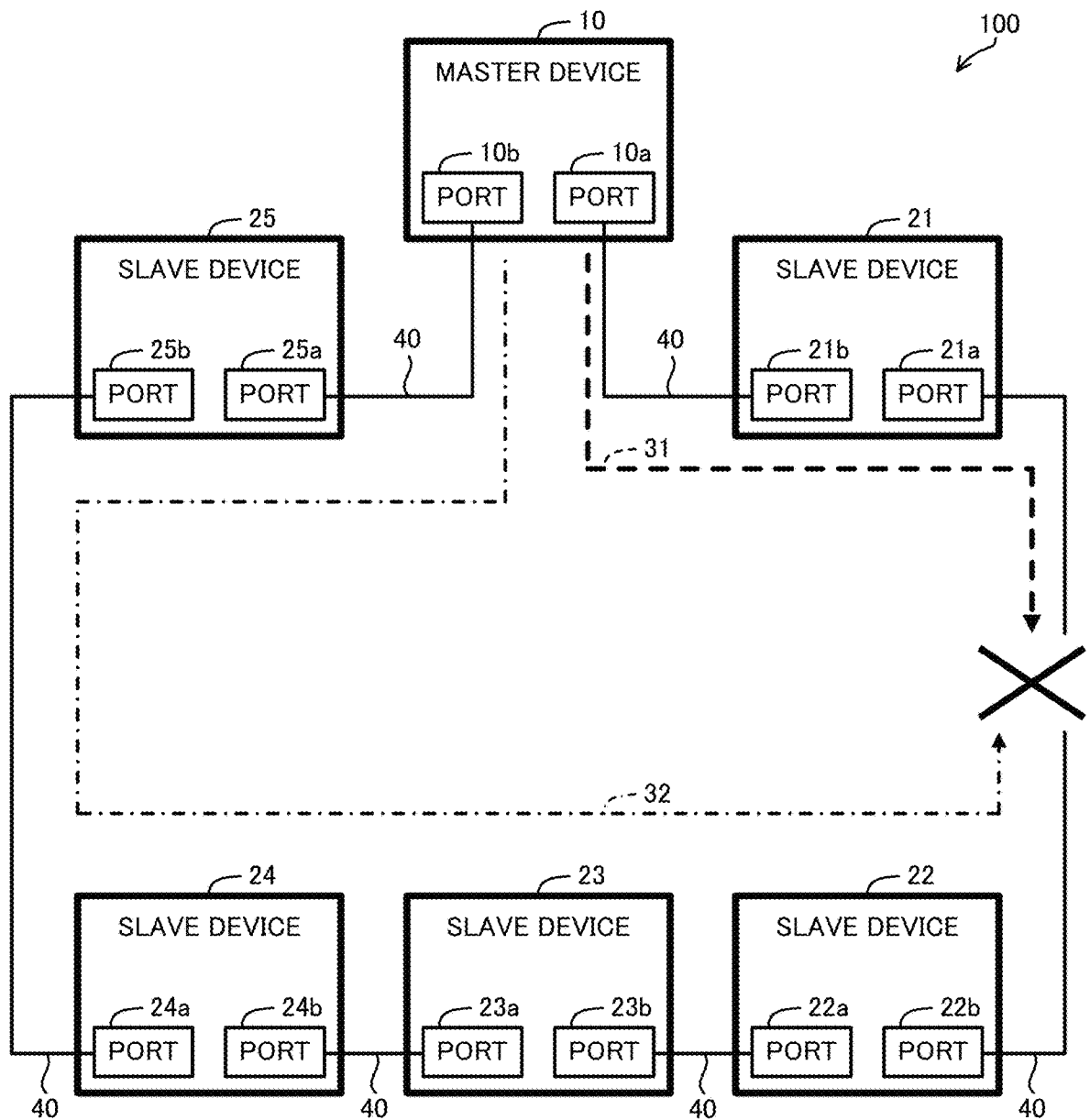
FIG. 16 is a block diagram of the communication system according to Embodiment 1 with a communication fault.

FIG. 16 shows an example of a broken link resulting from a communication fault between the slave device 21 and the slave device 22. In this case, the slave device 21 determines that management data to be received periodically in the CCW direction 32 has been interrupted, and thus detects a communication fault in the communication channel from the master device 10 to the slave device 21 in the CCW direction 32. The slave devices 22 to 25 determine that management data to be received periodically in the CW direction 31 has been interrupted, and thus detect a communication fault in the communication channel from the master device 10 to the slave devices 22 to 25 in the CW direction 31. In response to the interruption of management data to be received periodically in the CW direction 31 and the CCW direction 32, the master device 10 detects a communication fault in the ring network. Neither the master device 10 nor the slave devices 20 identifies the location of a communication fault in the ring network.

Referring back to FIG. 15, when management data is determined not to be interrupted in step S271 (No in step S271), the processing performed by the slave devices 20 then returns from the interruption detection to the slave processing shown in FIG. 8. When determining that management data is interrupted (Yes in step S271), the management data processor 230 writes information indicating an interruption to update the determination information 251 (step S272). More specifically, the management data processor 230 sets, to an initial value of −1, the count of relays associated with the communication path having an interruption of management data. For example, in the example communication fault as shown in FIG. 16, the slave device 22 updates the determination information 251 as shown in FIG. 17. The processing performed by the slave devices 20 then returns from the interruption detection to the slave processing shown in FIG. 8.

At least one of the master device 10 and the slave devices 20 may identify the location of a fault by comparing the determination information 251 among the slave devices 20. More specifically, in the example in FIG. 16, comparing the determination information 251 between the slave devices 21 and 22 determines that the slave devices 21 and 22 have different paths associated with the value −1 indicating an interruption. This indicates that a fault has occurred in the communication channel between the slave devices 21 and 22. For example, in response to a communication fault, the master device 10 may request each slave device 20 to provide the determination information 251 and compare the determination information 251 among the slave devices 20.

Referring back to FIG. 8, after step S27, the slave device 20 repeats the processing in step S21 and subsequent steps. Thus, the slave device 20 repeats the transfer of management data, the update of the determination information 251, and the reception of control data. For example, when the ring network recovers from a communication fault shown in FIG. 16, the slave device 20 receives management data in the two directions again and updates the determination information 251. The slave device 20 then causes the control data processor 240 to perform a reception based on this determination information 251.

As described above, the master device 10 outputs management data in each of the CW direction 31 and the CCW direction 32. The slave device 20 acquires a history of transmission of the management data output from the master device 10 and received by the slave device 20 in each of the CW direction 31 and the CCW direction 32. The master device 10 outputs control data in the CW direction 31 and the CCW direction 32. The slave device 20 processes, based on the acquired transmission history of management data, one of the control data output from the master device 10 in the CW direction 31 and the control data output from the master device 10 in the CCW direction 32 to control equipment. Thus, the master device 10 transmits redundant control data in the two directions of the redundant communication path, and the slave device 20 processes the control data transmitted in either the CW direction 31 or the CCW direction 32. In response to any communication fault in one path, the slave device can receive control data without using the path with the fault. The communication system using the ring communication path thus has higher tolerance to faults.

The master device 10 repeatedly outputs management data in each of the CW direction 31 and the CCW direction 32, and outputs control data having the destination to be a slave device 20 in the two directions. The slave device 20 determines the status of communication in each of these two directions based on whether management data has been received in the CW direction 31 and the CCW direction 32. In response to an interruption of management data to be received in either the CW direction 31 or the CCW direction 32, the slave device 20 receives and processes the control data output in the other direction. Thus, at the interruption of management data resulting from a communication fault, the slave device 20 can receive control data output in the other direction without long delay or without waiting for a notification of such a communication fault. This improves real-time data provision during maintaining communication against any communication faults.

The management data includes the history information 631. The control data processor 240 compares the history information 631 included in management data received in the CW direction 31 with the history information 631 included in management data received in the CCW direction 32. Based on the comparison result, the control data processor 240 receives and processes control data output in one of the CW direction 31 and the CCW direction 32. Thus, control data can be processed appropriately depending on the status of each of the two paths from the master device 10 to the slave device 20.

The history information 631 indicates the count of relays corresponding to a hop count. The slave device 20, upon receiving management data in each of the CW direction 31 and the CCW direction 32, acquires the count of relays indicated by the management data, and receives and processes control data received through the path with the smaller count of relays. In other words, the slave device 20 processes, selectively from control data output from the master device 10 in the CW direction 31 and control data output from the master device 10 in the CCW direction 32, the control data received in the direction in which the management data with the smaller count of relays is received. Thus, the slave device 20 processes control data transmitted through the path with the lower hop count. The control data is usually transmitted in a shorter time with a lower hop count. The slave device 20 can process the control data arriving at the slave device 20 earlier, selectively from control data transmitted through a path and control data transmitted through another path of the redundant path.

Embodiment 2

Embodiment 2 will now be described focusing on the differences from Embodiment 1 described above. The same or corresponding components as in Embodiment 1 are given the same reference signs, and will not be described or will be described briefly. In Embodiment 1, the count of relays indicated by the history information 631 is used to determine the communication path to be assigned a higher priority selectively from the two communication paths. However, this determination may be based on the time taken for data transmission. An embodiment of selecting a path to be assigned priority based on the time taken for transmission will now be described.

Figure 18:
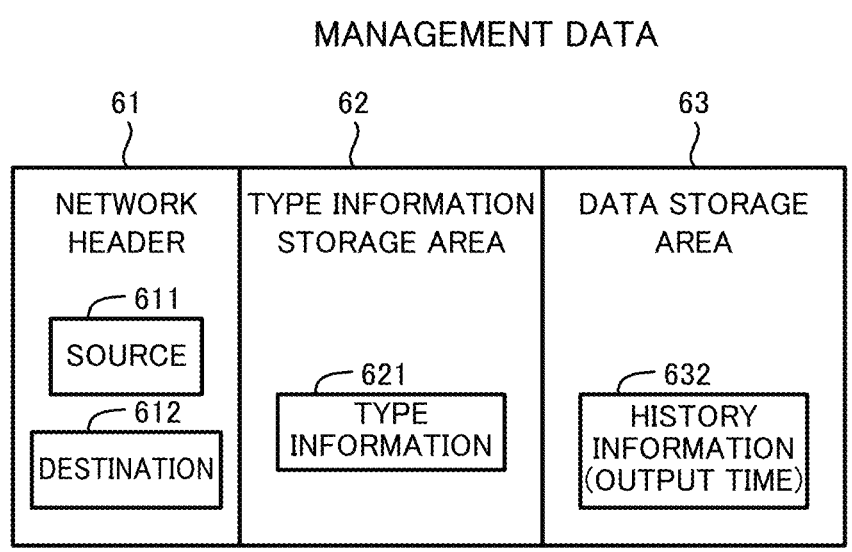
FIG. 18 is a diagram of management data in Embodiment 2 showing the data structure.

FIG. 18 is a diagram of management data in the present embodiment. As shown in FIG. 18, management data includes the data storage area 63 storing the history information 631 indicating the output time of this management data. The master device 10 generates the history information 631 and outputs management data including the generated history information 631. The history information 631 indicates the output time at which the master device 10 outputs this management data.

Figure 19:
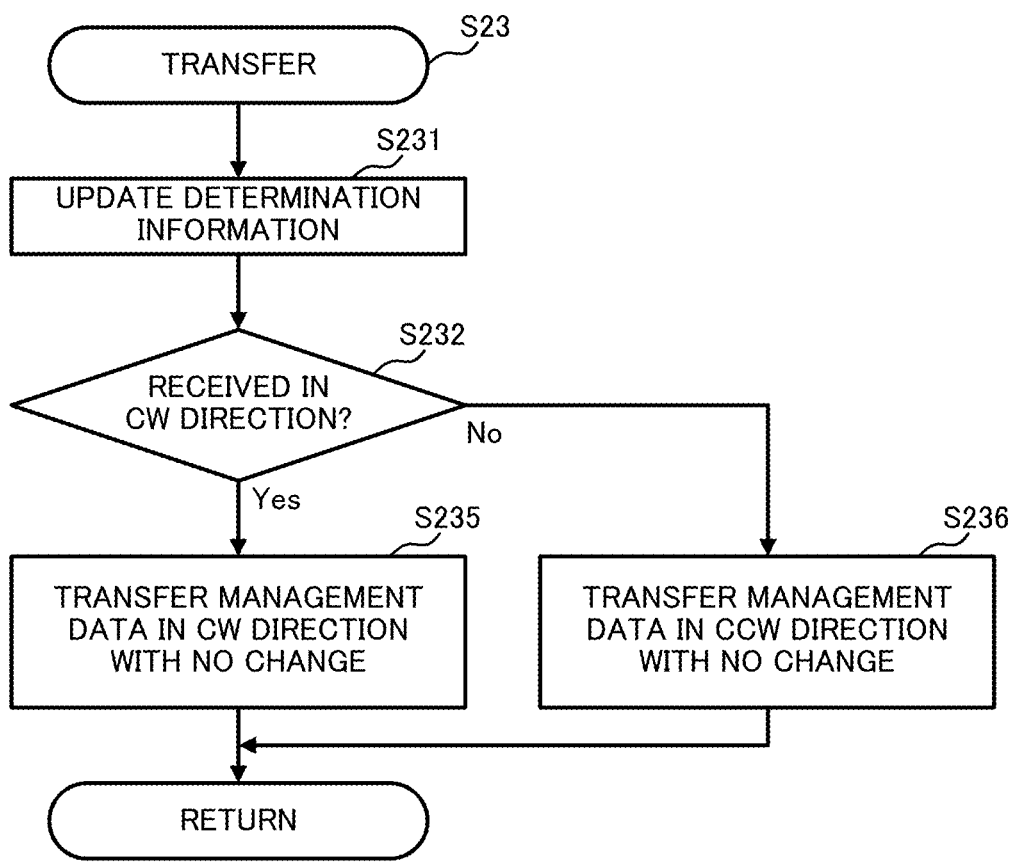
FIG. 19 is a flowchart showing a data transfer in Embodiment 2.

FIG. 19 is a flowchart showing a data transfer performed by the management data processor 230 in the slave device 20. In the data transfer, the management data processor 230 performs the processing corresponding to steps S231 and S232 shown in FIG. 9. However, in updating the determination information 251 in step S231, the management data processor 230 acquires the traveling period that has elapsed from when the master device 10 outputs management data to when the slave device 20 receives the management data. More specifically, the management data processor 230 acquires the output time included in management data, and calculates the time elapsed between the output time and the reception time of the management data. As shown in FIG. 20, the management data processor 230 writes the traveling period in a manner associated with the port number of the port and the communication path through which the management frame has been received. The management data processor 230 thus updates the determination information 251. The traveling period has an initial value of −1.

Referring back to FIG. 19, when the determination result in step S232 is affirmative (Yes in step S232), the management data processor 230 transfers, in the CW direction 31, the management data with no change (step S235). When the determination result in step S232 is negative (No in step S232), the management data processor 230 transfers, in the CCW direction 32, the management data with no change (step S236). The processing performed by the slave device 20 then returns from the data transfer to the slave processing shown in FIG. 8.

Figure 21:
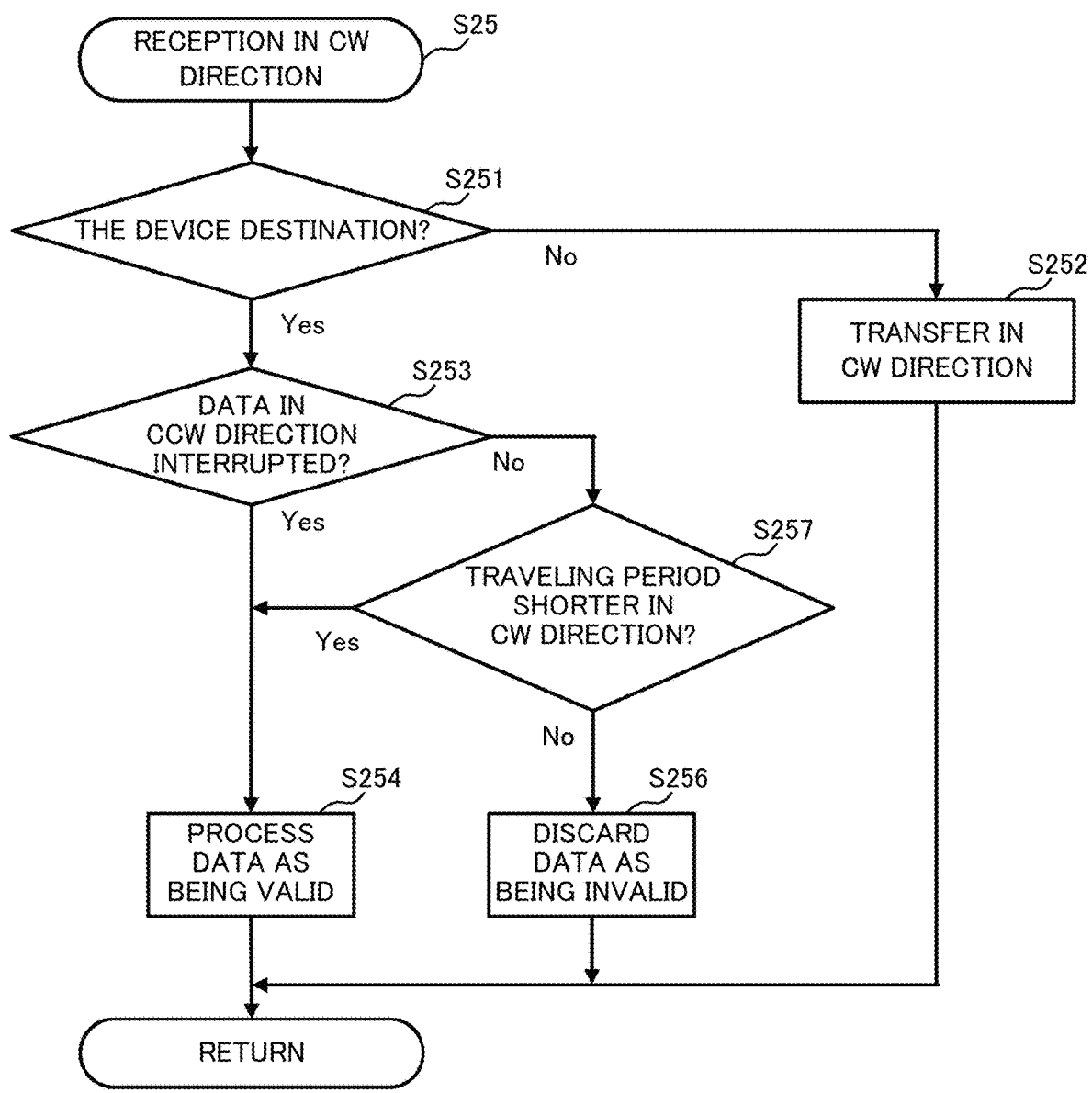
FIG. 21 is a flowchart showing a reception in the CW direction in Embodiment 2.

FIG. 21 shows the details of the reception in the CW direction 31. In the reception in the CW direction 31, when the determination result in step S253 is negative (No in step S253), the control data processor 240 determines whether the traveling period is shorter in the CW direction 31 (step S257). More specifically, the control data processor 240 reads the determination information 251 and determines whether the traveling period associated with the CW direction 31 is shorter than the traveling period associated with the CCW direction 32.

When determining that the traveling period is shorter in the CW direction 31 (Yes in step S257), the control data processor 240 advances the processing to step S254. When determining that the traveling period is not shorter in the CW direction 31 (No in step S257), the control data processor 240 advances the processing to step S256.

Figure 22:
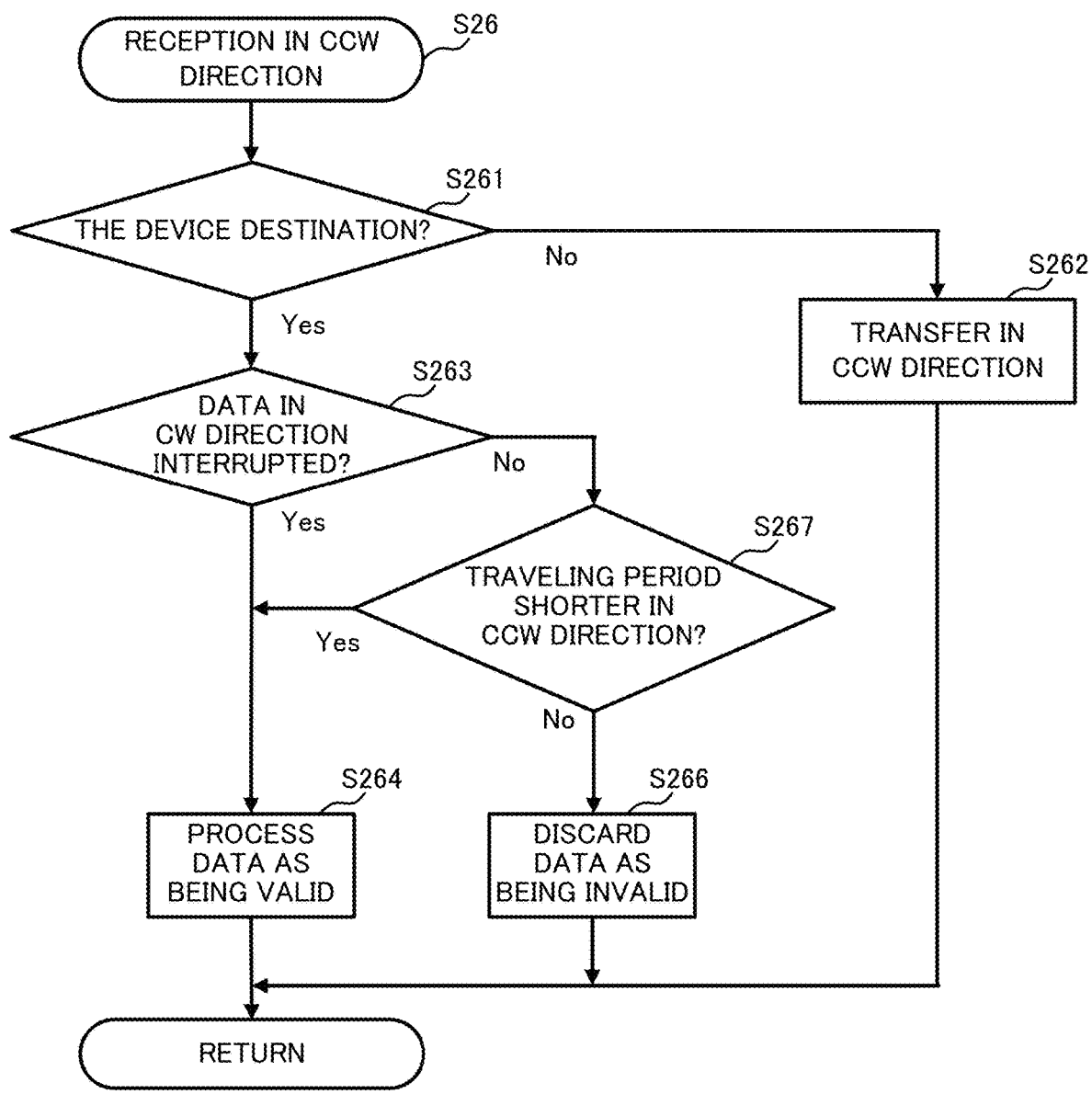
FIG. 22 is a flowchart showing a reception in the CCW direction in Embodiment 2.

FIG. 22 shows the details of the reception in the CCW direction 32. In the reception in the CCW direction 32, when the determination result in step S263 is negative (No in step S263), the control data processor 240 determines whether the traveling period is shorter in the CCW direction 32 (step S267). More specifically, the control data processor 240 reads the determination information 251 and determines whether the traveling period associated with the CCW direction 32 is shorter than the traveling period associated with the CW direction 31.

When determining that the traveling period is shorter in the CCW direction 32 (Yes in step S267), the control data processor 240 advances the processing to step S264. When determining that the traveling period is not shorter in the CCW direction 32 (No in step S267), the control data processor 240 advances the processing to step S266.

The slave device 20 also performs the processing corresponding to the interruption detection shown in FIG. 15. However, in step S272 performed in the interruption detection, the management data processor 230 rewrites the traveling period to an initial value of −1 as information indicating an interruption.

As described above, the history information 631 indicates an output time. The control data processor 240 receives and processes control data transmitted through the path in the shorter traveling period. More specifically, the control data processor 240 processes, selectively from control data output from the master device 10 in the CW direction 31 and control data output from the master device 10 in the CCW direction 32, the control data received in the direction in which the management data with the shorter time elapsed between the acquired output time and the reception time of the management data is received. Thus, the control data processor 240 can reliably assign, selectively from the two paths, priority to the path through which data has been transmitted in the shorter time. For example, the control data processor 240 can select a path with the higher hop count but with the shorter traveling period.

Although the embodiments of the present disclosure have been described above, the present disclosure is not limited to the above embodiments.

Figure 23:
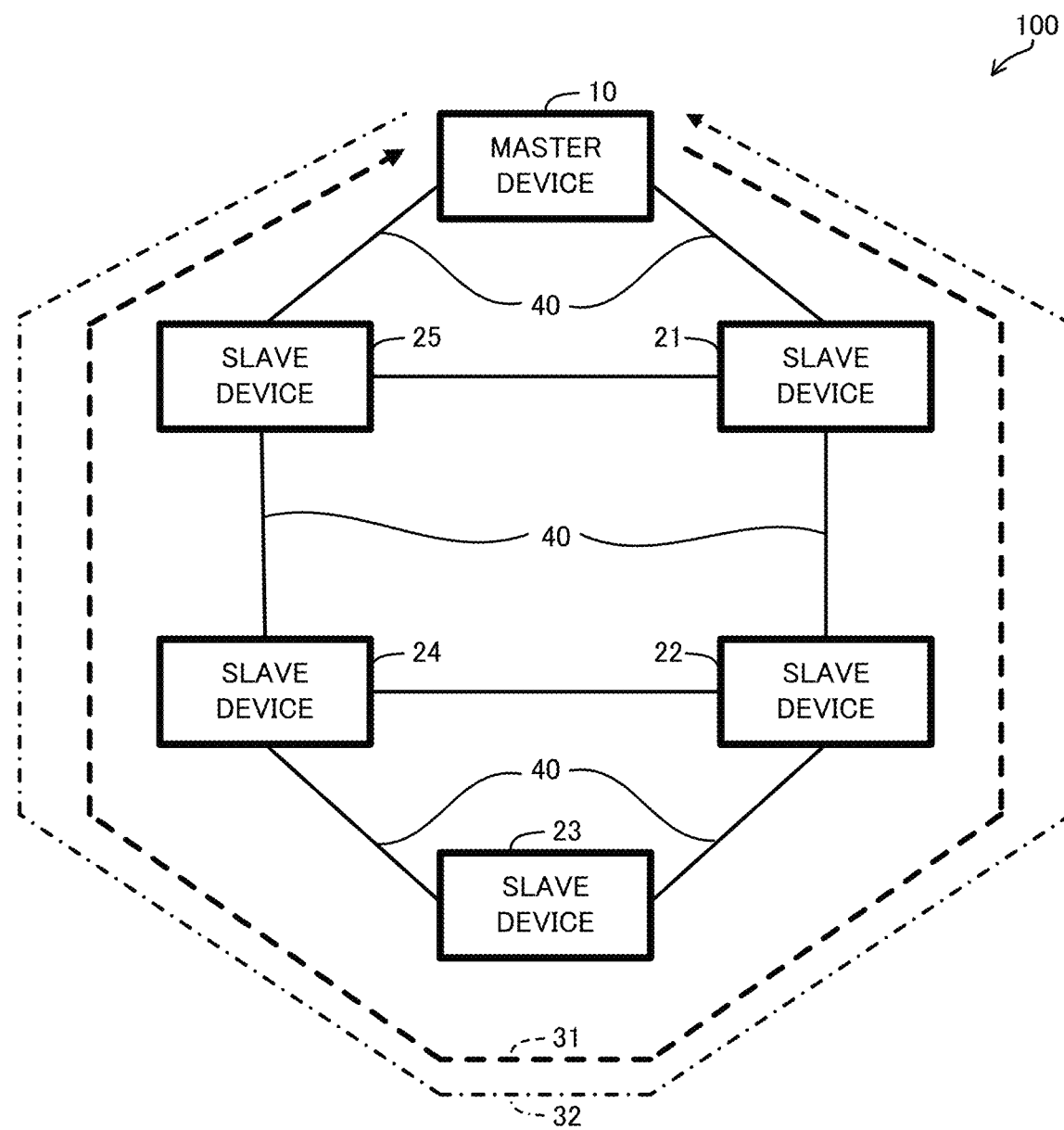
FIG. 23 is a block diagram of a communication system in a modification.

For example, although the communication system 100 corresponds to a ring network in the above example, the communication system 100 may be any other network. For example, the communication system 100 may be a mesh network as shown in FIG. 23. Such a network may define, as a redundant communication path of management data and control data, the communication path 40 in the CW direction 31 from a master node through slave nodes and back to the master node and the communication path 40 in the CCW direction 32, opposite to the CW direction 31, from the master node through the slave nodes and back to the master node. Such a network has the same advantageous effects as in the above embodiments.

The start and end points of the path in the CW direction 31 and the path in the CCW direction 32 are not limited to the master device 10. The path in the CW direction 31 and the path in the CCW direction 32 each may be a loop with no start point or end point. The master node and the slave nodes may not be distinguished from each other. One of multiple nodes that equally output and receive control data may be specified as a node for outputting management data.

In the above examples, the communication system has the redundant communication path of control data with no communication fault, and assigns priority to the path that has the smaller count of relays or the shorter traveling period selectively from the paths in the CW direction 31 and the CCW direction 32. However, priority may be assigned to the path selected in any other manner. For example, the communication system may assign priority to the path with the larger count of relays or with the longer traveling period. When the paths have an equal count of relays, the communication system may determine the path to be assigned priority in accordance with the length of traveling period. When the paths have an equal traveling period, the communication system may determine the path to be assigned priority in accordance with the count of relays.

The path to be assigned priority may be determined using a criterion other than the determination information 251. For example, the slave device 20 may store, in the memory 250, control data received in the past, and determine whether control data is identical to the stored data for each reception of control data. When control data is identical to the stored data, the slave device 20 may discard the control data. When control data is not identical to the stored data, the slave device 20 may determine that the control data is valid and process the control data.

The slave device 20 may update the determination information 251 to incorporate a flag indicating the path to be assigned priority selectively from the two paths. Thus, the control data processor 240 can determine whether control data is valid or invalid by simply referring to the flag without comparing the numbers of relays or the traveling period.

Although the master device 10 outputs control data and management data in equal cycles in the above embodiments, the master device 10 may output the data in any other manner. In some embodiments, the master device 10 may output control data and management data in different cycles, or may output control data irregularly as appropriate.

The functions of the master device 10 and the slave device 20 can be implemented by dedicated hardware or a general-purpose computer system.

For example, the program 58 executable by the processor 51 may be stored in a non-transitory computer-readable recording medium for distribution. The program 58 is installed in a computer to provide a device that performs the above processing. Examples of such recording media include a flexible disk, a compact disc read-only memory (CD-ROM), a digital versatile disc (DVD), and a magneto-optical (MO) disk.

The program 58 may be stored in a disk device included in a server on a communication network, typically the Internet, and may be, for example, superimposed on carrier waves to be downloaded to a computer.

The processing described above may also be performed by the program 58 being activated and executed while being transferred through a communication network.

The processing described above may also be performed by the program 58 being entirely or partially executed on a server with a computer transmitting and receiving information about the processing through a communication network while executing a program.

In the system with the above functions implementable, for example, partly by the operating system (OS) or through cooperation between the OS and applications, portions related to the part other than the OS may be stored in a medium for distribution or may be downloaded to a computer.

Means for implementing the functions of the master device 10 and the slave device 20 is not limited to software. The functions may be partly or entirely implemented by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure may be used for creating robust networks with fault tolerance.

REFERENCE SIGNS LIST

100 Communication system
10 Master device
10a, 10b, 20a, 20b, 21a, 21b, 22a, 22b, 23a, 23b, 24a, 24b, 25a, 25b Port
11 Receiver
12 Identifier
13 Management data processor
14 Control data processor
15 Transmitter
20 to 25 Slave device
210 Receiver
220 Identifier
230 Management data processor
232 Step
240 Control data processor
250 Memory
251 Determination information
260 Transmitter
31 CW direction
32 CCW direction
40 Communication path
51 Processor
52 Main memory
53 Auxiliary memory
54 Input device
55 Output device
56 Communicator
57 Internal bus
58 Program
61 Network header
62 Type information storage area
63 Data storage area
611 Source
612 Destination
621 Type information
631 History information
632 Control information
70 Equipment

The invention claimed is:

1. A communication system, comprising:
a master device and a slave device connectable to each other and forming a ring communication path,
wherein
the master device
outputs management data to manage communication along the ring communication path in a first direction and in a second direction opposite to the first direction and receives the management data in the first direction and in the second direction, and
outputs, in the first direction and in the second direction, control data to be used by the slave device to control equipment, and
the slave device acquires, using information included in the management data, a history of transmission of the management data output from the master device and received by the slave device in the first direction and in the second direction, and processes, based on the acquired history, one of the control data output from the master device in the first direction and the control data output from the master device in the second direction to control the equipment.

2. The communication system according to claim 1, wherein the communication system comprises a plurality of the slave devices, the management data includes history information indicating a count of relays that is a count of slave devices that have relayed the management data, and each of the slave devices acquires, upon receiving the management data output in the first direction and in the second direction, the count of relays indicated by the history information included in the management data, increments the count of relays, and transfers the management data with the incremented count of relays, and processes, selectively from the control data output from the master device in the first direction and the control data output from the master device in the second direction, the control data received in a direction in which the management data with a smaller count of relays is received.

3. The communication system according to claim 1, wherein the management data includes history information indicating an output time at which the master device outputs the management data, and the slave device acquires the output time indicated by the history information included in the management data transmitted in the first direction and in the second direction, and processes, selectively from the control data output from the master device in the first direction and the control data output from the master device in the second direction, the control data received in a direction in which the management data with shorter time elapsed between the acquired output time and reception time of the management data is received.

4. The communication system according to claim 1, wherein the master device outputs the management data and the control data in predetermined cycles.

5. The communication system according to claim 1, wherein the slave device determines a communication status in each of the first direction and the second direction based on whether the management data has been received in each of the first direction and the second direction, and in response to an interruption of the management data in one of the first direction and the second direction, processes the control data received in the other of the first direction and the second direction.

6. A communication device connectable to another communication device and forming a ring communication path, the communication device being configured to perform operations comprising:

acquiring, using information included in the management data, a history of transmission of management data to manage communication output from the another communication device and received by the communication device along the ring communication path in a first direction and in a second direction opposite to the first direction; and processing, based on the acquired history, one of control data output from the another communication device in the first direction and control data output from the another communication device in the second direction to control equipment.

7. A non-transitory computer readable recording medium storing a program for causing a computer connectable to a communication device and forming a ring communication path to perform operations comprising:

acquiring, using information included in the management data, a history of transmission of management data to manage communication output from the communication device and received by the computer along the ring communication path in a first direction and in a second direction opposite to the first direction; and processing, based on the acquired history, one of control data output from the communication device in the first direction and control data output from the communication device in the second direction to control equipment.

* * * * *